US011048569B1

(12) United States Patent
Seshadri et al.

(10) Patent No.: US 11,048,569 B1
(45) Date of Patent: *Jun. 29, 2021

(54) ADAPTIVE TIMEOUT MECHANISM

(71) Applicant: Amazon Technologies, Inc., Seattle, WA (US)

(72) Inventors: Kiran Kalkunte Seshadri, Cedar Park, TX (US); Sundeep Amirineni, Austin, TX (US); Nafea Bshara, San Jose, CA (US); Asif Khan, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/794,467

(22) Filed: Feb. 19, 2020

Related U.S. Application Data

(63) Continuation of application No. 15/634,696, filed on Jun. 27, 2017, now Pat. No. 10,592,322.

(51) Int. Cl.
| | |
|---|---|
| *G06F 11/00* | (2006.01) |
| *G06F 11/07* | (2006.01) |
| *G06F 11/34* | (2006.01) |
| *G06F 11/32* | (2006.01) |
| *G06F 11/30* | (2006.01) |

(52) U.S. Cl.
CPC ........ *G06F 11/0757* (2013.01); *G06F 11/076* (2013.01); *G06F 11/0745* (2013.01); *G06F 11/3006* (2013.01); *G06F 11/324* (2013.01); *G06F 11/3485* (2013.01)

(58) Field of Classification Search
CPC .................................................. G06F 11/0757
See application file for complete search history.

(56) References Cited

U.S. PATENT DOCUMENTS

| | | | |
|---|---|---|---|
| 5,287,362 | A | 2/1994 | Liencres |
| 5,651,113 | A | 7/1997 | Lin et al. |
| 6,370,656 | B1 | 4/2002 | Olarig et al. |
| 6,526,433 | B1 | 2/2003 | Chang et al. |
| 7,310,751 | B2 | 12/2007 | Tayler et al. |
| 8,214,492 | B2 | 7/2012 | Chauvin et al. |
| 8,220,001 | B2 | 7/2012 | Chan et al. |
| 9,229,839 | B2 | 1/2016 | Singh et al. |
| 9,804,824 | B1 | 10/2017 | Ning et al. |
| 10,592,322 | B1 * | 3/2020 | Seshadri ............. G06F 11/0745 |
| 2004/0237006 | A1 | 11/2004 | Adkisson et al. |

(Continued)

OTHER PUBLICATIONS

U.S. Appl. No. 15/634,696 , "Final Office Action", dated Aug. 9, 2019, 15 pages.

(Continued)

*Primary Examiner* — Jonathan D Gibson
(74) *Attorney, Agent, or Firm* — Kilpatrick Townsend & Stockton LLP

(57) ABSTRACT

Disclosed herein are techniques for preventing or minimizing completion timeout errors on a computer device. An apparatus include a processing logic circuit and a timeout logic. The timeout logic is configured to: generate a timeout event based on a transaction not completed by the processing logic circuit within a timeout period; determine a number of the timeout events generated during a monitoring period; and responsive to determining that the number equals to or exceeds a threshold, reduce the timeout period.

22 Claims, 8 Drawing Sheets

(56) References Cited

U.S. PATENT DOCUMENTS

| | | |
|---|---|---|
| 2005/0188277 A1 | 8/2005 | Tayler et al. |
| 2008/0062863 A1 | 3/2008 | Ginde |
| 2009/0254692 A1* | 10/2009 | Feehrer ............... G06F 11/0745 |
| | | 710/315 |
| 2009/0292960 A1 | 11/2009 | Haraden et al. |
| 2010/0211959 A1 | 8/2010 | Chan et al. |
| 2010/0311421 A1 | 12/2010 | Mach |
| 2011/0106940 A1* | 5/2011 | Chauvin ............. G06F 11/0757 |
| | | 709/224 |
| 2013/0242749 A1 | 9/2013 | Herz et al. |

OTHER PUBLICATIONS

U.S. Appl. No. 15/634,696 , "Non-Final Office Action", dated Feb. 19, 2019, 12 pages.

U.S. Appl. No. 15/634,696 , "Notice of Allowance", dated Nov. 8, 2019, 30 pages.

\* cited by examiner

US 11,048,569 B1

ADAPTIVE TIMEOUT MECHANISM

CROSS-REFERENCE TO RELATED APPLICATIONS

This application is a Continuation of U.S. patent application Ser. No. 15/634,696, filed Jun. 27, 2017, now U.S. Pat. No. 10,592,322 issued on Mar. 17, 2020, and entitled "ADAPTIVE TIMEOUT MECHANISM," which is incorporated herein by reference in its entirety.

BACKGROUND

Cloud computing techniques can include use of networked computing resources (e.g., hardware and software) of a cloud provider to be made available for use by clients. Clients can access the networked computing resources via a network, such as the internet, to configure the networked computing resources to provide a service or to access a service provided by another client. Cloud computing techniques can facilitate more efficient use of networked computing resources by, for example, enabling the resources to be allocated as needed between clients (e.g., for clients to scale services operating on cloud computing resources or to prototype new cloud enabled services) and/or by allocating hardware in a time sliced manner to several clients concurrently. Cloud service providers can provide systems with varying combinations of processing performance, memory performance, storage capacity or performance, and networking capacity or performance. Thus, a client can select a computer system that can potentially be more efficient at executing a particular task.

In some cases, transactions between the devices or subsystems of a cloud infrastructure may not be successfully completed within an expected time period. For example, a server requesting a memory read from a memory or storage device may not receive a response from the memory or storage device in a reasonable amount of time for various reasons, which may cause critical errors, such as completion timeout errors, on the server.

In some cloud computing environments, some clients may desire to use hardware that is proprietary or highly specialized for executing their computing tasks. Enabling use of client defined hardware within a cloud infrastructure can raise further performance, security, and/or stability concerns. For example, in some cases, the client defined hardware may not be configured properly, may not function properly, or may be vulnerable to network-based attacks, and thus may increase the probability of completion timeout errors for various reasons. The completion timeout errors may be uncorrectable by hardware, and thus may impact the system stability and/or performance.

BRIEF DESCRIPTION OF THE DRAWINGS

Various embodiments in accordance with the present disclosure will be described with reference to the drawings, in which.

DETAILED DESCRIPTION

Figure 1:
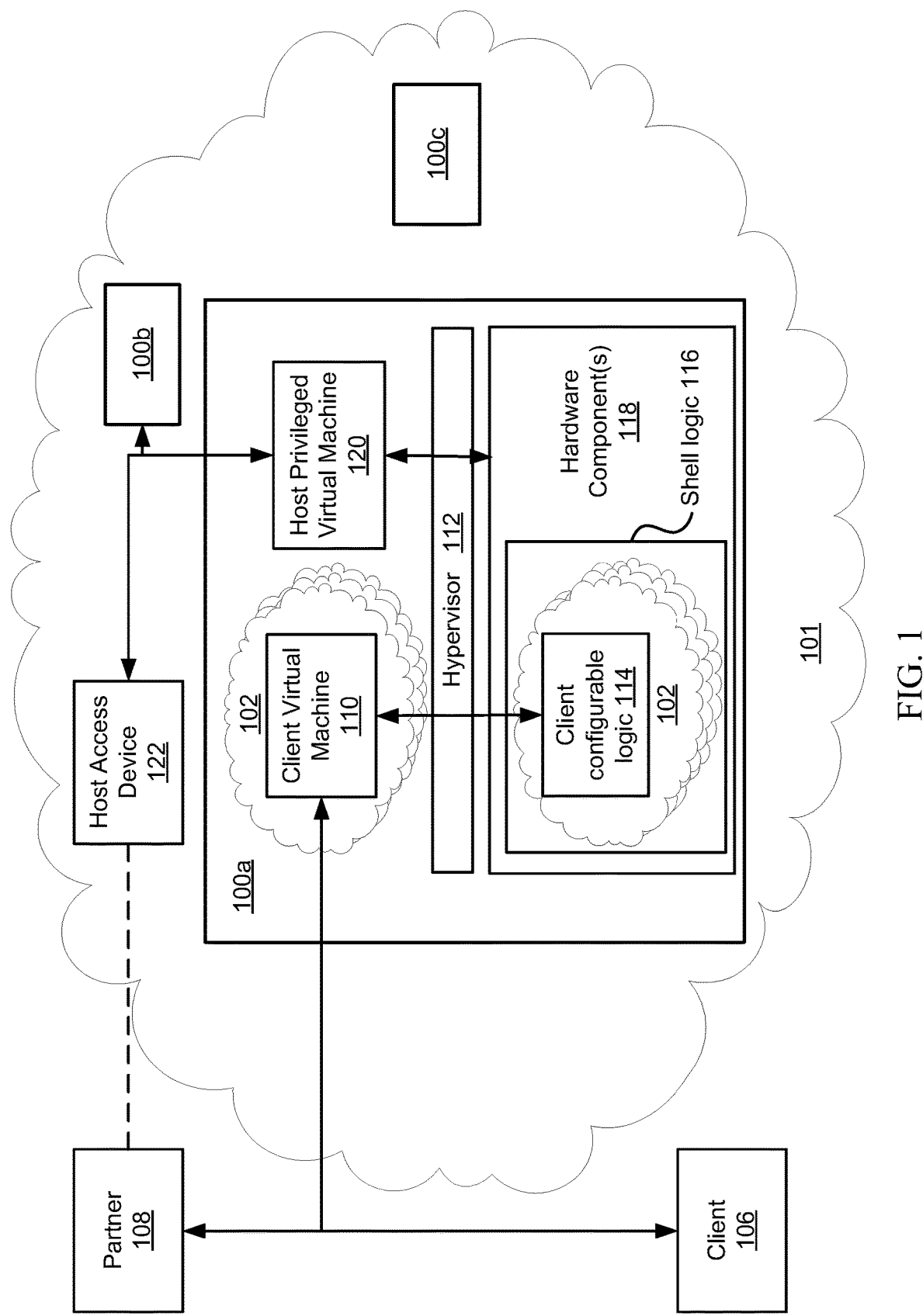
FIG. 1 illustrates an example cloud computing system and corresponding domains according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In some cloud computing environments, certain clients may desire to have specialized computing resources (i.e., hardware computing resources) that may enable more efficient processing of certain client functions. One solution for providing specialized computing resources in a multi-tenant, cloud environment is to provide a networked computing resource including a client configurable logic (such as by providing a computer device with an add-in card including a field-programmable gate array (FPGA)). Configurable logic may be hardware that can be programmed or configured to perform a logic function specified by configuration data that is applied to or loaded on the configurable logic. For example, a user of the computing resources can provide a specification (such as source code written in a hardware description language) for configuring the configurable logic, and the configurable logic can be configured according to the specification to perform a task for the user.

However, allowing a client of a cloud service to access low-level hardware of a cloud computer device can potentially introduce security, performance, and privacy issues within the cloud infrastructure. As a specific example, a faulty or malicious design from one user could potentially corrupt or read data from other clients if the configured logic is able to read from and/or write to memory of other clients' memory space. As another specific example, a faulty, malicious, or less-secure design from one client could potentially cause a denial of service to users if the configured logic causes one or more devices within the cloud infrastructure to malfunction (e.g., crash, hang, or reboot) or be denied infrastructure resources.

When a transaction between devices or subsystems of a cloud infrastructure is not completed successfully within an expected time period, e.g., a memory request from a host device does not get a response from an endpoint device, a completion timeout error may occur on the host device after the host device waits for a defined timeout period. The endpoint device may fail to respond within the expected time period and thus cause the completion timeout error for various reasons, such as malfunctioning, dropping the request, unsupported request, incorrect address implemented in the configurable logic, receiving Distributed Denial of Service (DDoS) attacks, etc. The completion timeout error may be an uncorrectable non-fatal error, where the hardware may not handle the corrupted transaction, and thus device-specific software may need to be used to handle the completion timeout error, which may affect the performance of host device.

Disclosed herein are techniques that can be used to prevent or minimize completion timeout errors during transactions between various devices or subsystems in a networked computing system (e.g., a cloud environment) that enables specialized or customer configurable computing resources. In one example, a completer device (e.g., an endpoint or a peripheral device) may include a preventive timer that can generate a timeout event and trigger an error message to be sent to the requester device (e.g., a host) before a completion timeout error could occur on the requester device. For a non-posted transaction request, such as a memory read request, from a requester device (e.g., a host) to the completer device, the completer device may wait for a certain amount of time (determined by a timeout value of the preventive timer) that is less than a completion timer timeout time on the requester device, and send a message to the requester device if a response to the request has not been sent yet. When there are many requests to the completer device that could cause completion timeout errors (such as during a DDoS attack) or the interconnect between the requester device and the completer device has been occupied, having a fixed timeout value for the preventive timer could still cause a completion timeout error. In such cases, the timeout value for the preventive timer on the completer device may be adjusted adaptively based on the number of timeout events generated by the preventive timer on the completer device within a pre-determined time window, in order to prevent a completion timeout error for a requested transaction.

As described above, a cloud infrastructure may include a variety of computer resources, where one type of the computer resources may include a computer device (e.g., a host or other network device) comprising a client configurable logic circuit. The client configurable logic circuit can be programmed or configured by a client of the cloud infrastructure so that hardware (e.g., the configurable logic) of the computing resource can be customized by the client. For example, the client can program the configurable logic so that it functions as a hardware accelerator that is tightly coupled to the computer device. As a specific example, the hardware accelerator can be accessible via a local interconnect, such as Peripheral Component Interconnect Express (PCI-Express or PCIe), of the computer device. The client can execute an application on the computer device and at least some tasks of the application can be performed by the hardware accelerator using PCIe commands. By tightly coupling the hardware accelerator to the computer device, the latency between the hardware accelerator and the computer device can be reduced, which may potentially increase the processing speed of the application.

A cloud service provider can potentially increase the security and/or availability of the computing resources by wrapping or encapsulating the user's configurable logic (also referred to herein as application logic) within a shell logic. Encapsulating the configurable logic can include limiting or restricting the configurable logic's access to configuration resources, physical interfaces, hard macros of the client configurable logic circuit, and various peripherals of the client configurable logic circuit. The shell logic can provide a framework or sandbox for the configurable logic to work within. In particular, the shell logic can communicate with the configurable logic and constrain the functionality of the configurable logic. For example, the shell logic can perform bridging functions between the local interconnect (e.g., the PCIe interconnect) and the configurable logic so that the configurable logic cannot directly control the signaling on the local interconnect. The shell logic may be responsible for forming packets or bus commands on the local interconnect and ensuring that the protocol requirements are met. By controlling commands on the local interconnect, the shell logic can potentially prevent malformed commands or commands to out-of-bounds locations.

In addition, the shell logic may include an adaptive timeout prevention block. The adaptive timeout prevention block may include a timeout logic that includes a configurable preventive timer that can generate timeout events, and a timeout handling logic that can terminate a transaction cycle after the timeout event and before a completion timeout error could occur on a requester device. The adaptive timeout prevention block may also include a moderation logic that can monitor the timeout events generated by the timeout logic, and dynamically determine a timeout value for the preventive timer on the timeout logic based on the number of timeout events generated by the timeout logic in a given time period. In this way, a transaction request from a requester device among multiple transaction requests received by the completer device may not cause a completion timeout error on the requester device if, for example, the configurable logic does not function properly or is under attack.

FIG. 1 illustrates a simplified logical diagram of a host domain 101 of a cloud infrastructure system that may provide one or more cloud enabled services to a client 106 or a type of client referred to as a partner device 108. Host domain 101 can reside within a cloud infrastructure system. Computer devices 100a-100c and host access device 122 can each reside within the cloud infrastructure system. Computer devices 100a-100c and host access devices 122 can reside within host domain 101. Hypervisor 112, client virtual machine 110, host privileged virtual machine 120, and hardware component(s) 118 can reside within computer device 100a. Partner device 108 may be a client of host domain 101 that is privileged to utilize cloud resources to provide a service. For example, partner device 108 can be used to request, via host access device 122, one or more resources of the cloud infrastructure system to enable a service. Client 106 may be a user of a service of partner device 108. Thus, partner device 108 may have more privileged access to cloud infrastructure system than client 106. The service can be enabled through use of one or more hardware components 118 of computer device 100a within host domain 101. The one or more hardware components 118 can be logically abstracted, via hypervisor 112, into a client virtual machine 110 that client 106 or partner device 108 is privileged to access. Hypervisor 112 can manage client virtual machine 110 and other virtual machines that may operate within host domain 101 (such as host privileged virtual machine 120). Host privileged virtual machine 120 is a privileged type of virtual machine that may have direct access to hardware component(s)118, drivers, or an operating system of computer device 100a. Hardware component (s)118 can include processors, memory, fixed function hardware, peripherals, and/or client configurable logic 114. The operating system may manage/schedule interactions between logical virtual machines and physical components within host domain 101. Client virtual machine 110 can be one of several virtual machines operating within computer device 100a and can be logically separated from hardware devices of host domain 101 that services client virtual machine 110.

The logical separation of client virtual machine 110 can be accomplished by logically isolating client virtual machine 110 into a client domain 102. Client domain 102 can be separated from a host domain 101 of a cloud infrastructure system. Hypervisor 112 may reside on the host domain 101 but have access to client domain 102 whereas virtual or physical devices of client domain 102 may be prevented from accessing virtual or physical devices of host domain 101 (or other client domains). Techniques disclosed herein can be used to create and manage client configurable logic 114 within the cloud infrastructure system. Client configurable logic 114 can include configurable hardware logic that can be used by partner device 108, for example, to implement and have access to a hardware device within the cloud infrastructure system.

Client configurable logic 114 can be configured to act as a hardware accelerator, for example. The hardware accelerator can be created using programmable logic device(s) such that multiple clients may be able to configure differing accelerators using a same underlying hardware device. As disclosed herein, client configurable logic 114 may reside within client domain 102. However, access between client virtual machine 110 and client configurable logic 114 may pass through a host domain 101 of a cloud infrastructure system so that the cloud infrastructure system can manage and monitor access to the underlying hardware components implementing client configurable logic 114.

Figure 2:
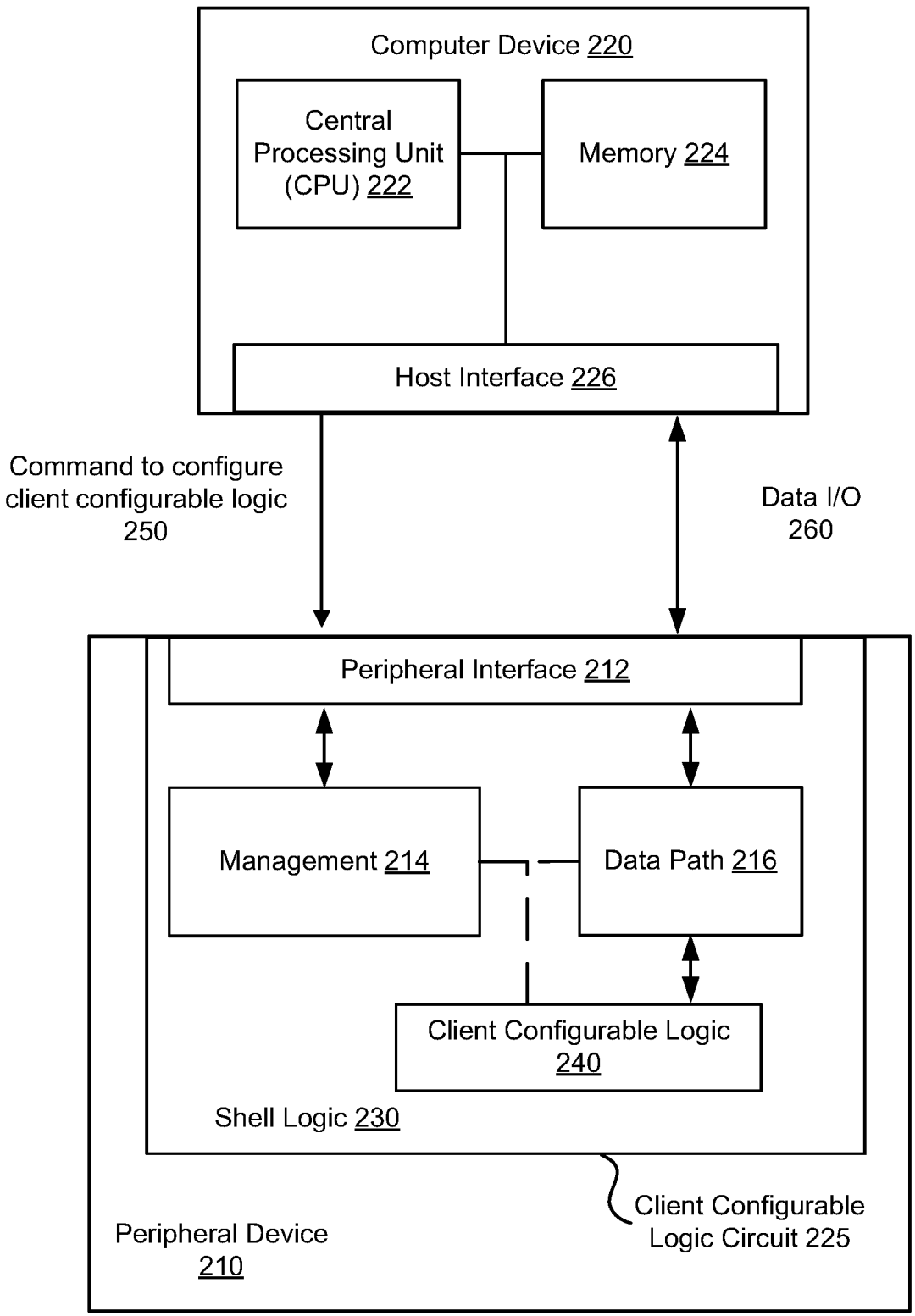
FIG. 2 is a simplified system diagram illustrating an example system including a client configurable logic circuit according to certain embodiments.

FIG. 2 is a system diagram showing an example of a computing system 200 including a peripheral device 210 and a computer device 220. System 200 may be used to implement client virtual machine 110 and/or client configurable logic 114 of FIG. 1. For example, client configurable logic 240 may be similar to client configurable logic 114 and client virtual machine 110 can be implemented within computer device 220. Computer device 220 can include a central processing unit (CPU) 222, memory 224, and a host interface 226. CPU 222 can be used to execute instructions stored in memory 224. For example, memory 224 can be loaded with all or a portion of the cloud service and CPU 222 can execute the instructions of the cloud service. The cloud service can communicate with a hardware accelerator of peripheral device 210 by issuing commands (e.g., transaction requests) using host interface 226.

A command can be a read request, a write request, a read response, a message, an interrupt, or other various data transmittals. The command can occur on a bus shared by multiple components. Specifically, values of signal lines of the bus can be modulated to transfer data on the bus using a communications protocol of the bus. The command can occur over one or more phases, such as an address phase and one or more data phases. Additionally or alternatively, the command can occur using one or more serial lines of a point-to-point interconnect that connects two components. Specifically, the command can be sent in a packet that is transmitted over the point-to-point interconnect.

Host interface 226 can include a bridge for communicating between CPU 222 using a local or front-side interconnect and components using a peripheral or expansion interconnect. Specifically, host interface 226 can be connected to a physical interconnect that is used to connect computer device 220 to peripheral device 210 and/or to other components. For example, the physical interconnect can be an expansion bus for connecting multiple components together using a shared parallel bus or serial point-to-point links. As a specific example, the physical interconnect can be PCI express, PCI, or another physical interconnect that couples computer device 220 to peripheral device 210. Thus, computer device 220 and peripheral device 210 can communicate using, for example, PCI bus commands or PCIe packets.

Peripheral device 210 may include a client configurable logic circuit 225 including a shell logic 230 and a client configurable logic 240. Shell logic 230 can include a peripheral interface 212, a management module 214, and data path module 216. Client configurable logic 240 can include hardware that is configurable to implement, for example, a hardware accelerator or a memory device. In other words, client configurable logic 240 can include logic that is programmable to perform a given function. For example, client configurable logic 240 can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and/or programmable input/output pins.

Shell logic 230 can be used to encapsulate the client configurable logic 240. For example, client configurable logic 240 can interface with various components of shell logic 230 using predefined interfaces so that client configurable logic 240 is restricted in access to other components of peripheral device 210. Shell logic 230 can include logic that isolates different components of peripheral device 210 from client configurable logic 240. As one example, hard macros of peripheral device 210 (such as a configuration access port or circuits for signaling on the physical interconnect) can be masked off so that client configurable logic 240 cannot directly access the hard macros.

Shell logic 230 may include peripheral interface 212 for communicating with the computer device 220. Specifically, peripheral interface 212 can be used to enable communicate with the computer device 220 using a communication protocol and a physical interconnect. As one example, computer device 220 can communicate with peripheral device 210 using a command including an address associated with peripheral device 210. Similarly, peripheral device 210 can communicate with computer device 220 using a command including an address associated with computer device 220. The addresses associated with various devices connected to host interface 226 may be predefined by a system architect and programmed into the devices. Additionally or alternatively, the communication protocol can include an enumeration sequence where the devices connected to host interface 226 may be queried and addresses may be assigned to each of devices as part of the enumeration sequence. After enumeration, peripheral interface 212 may route commands to functions of peripheral device 210 based on an address of the command.

Shell logic 230 can include management module 214 that can be used for managing and configuring peripheral device 210. Commands and data can be sent from computer device 220 to management module 214 using commands that target the address range of management module 214. For example, computer device 220 can generate commands (e.g., transaction requests) to transfer data (e.g., configuration data) and/or write control registers of peripheral device 210 that are mapped to one or more addresses within the address range of management module 214. Writing the control registers can cause peripheral device 210 to perform operations, such as configuring and managing peripheral device 210. As a specific example, configuration data corresponding to configurable logic to be implemented in client configurable logic 240 can be transmitted from computer device 220 to peripheral device 210 in one or more commands between host interface 226 and peripheral interface 212. A command 250 to configure client configurable logic 240 with the configuration data can be transmitted from computer device 220 to peripheral device 210. Specifically, command 250 can write a value to a control register mapped to management module 214 address space that will begin configuring client configurable logic 240. For example, the configuration data can be streamed into or loaded onto client configurable logic 240, for example, from computer device 220 or on-chip or off-chip memory accessible by peripheral device 210, as commands including the configuration data are processed by management module 214.

Shell logic 230 may also include a data path module 216 that can be used to exchange information (e.g., data input/output 260) between computer device 220 and peripheral device 210. Specifically, commands and data can be sent from computer device 220 to data path module 216 using commands that target the address range of data path module 216. Similarly, peripheral device 210 can communicate with computer device 220 using a command including an address associated with computer device 220. Data path module 216 can act as a translation layer between peripheral interface 212 and client configurable logic 240. Specifically, data path module 216 can include an interface for receiving information from client configurable logic 240, and data path module 216 can format the information for transmission from peripheral interface 212. Formatting the information can include generating control information for one or more commands and partitioning data into blocks that are sized to meet protocol specifications. Thus, data path module 216 can be interposed between client configurable logic 240 and physical interconnect. In this manner, client configurable logic 240 can potentially be blocked from formatting commands and directly controlling the signals used to drive the physical interconnect so that client configurable logic 240 cannot be used to inadvertently or maliciously violate protocols of the physical interconnect.

As described above, the physical interconnect that couples computer device 220 to peripheral device 210 may be PCI, PCIe, or any other interconnect. In digital interconnect protocols, such as PCIe or Advanced eXtensible Interface (AXI), different types of transactions may originate at the transaction layer. For example, PCIe supports four types of transactions that may originate at the transaction layer: memory, I/O, configuration, and message. Memory transactions (e.g., memory reads and writes) may be the basic method of transferring data. I/O transactions (e.g., I/O reads and writes) may be used for backward compatibility with PCI or ISA. Configuration transactions (e.g., configuration reads and writes) may be used by a PCIe root complex to configure the system during power-up. Message transactions may be used to send interrupts, error conditions, and other information through the interconnect.

For PCIe protocol, transactions can also be classified as posted, non-posted, and completion. Posted transactions are ones where the requester does not expect to and will not receive a completion Transaction Layer Packet (TLP). A PCIe memory write operation is an example of a posted transaction as it does not require a response from the completer (destination) device. Message transactions may also be posted. Non-posted transactions are ones where the requester device expects to receive a completion TLP from the completer device that services the request. A memory read request may be an example of a non-posted transaction that could cause a completion transaction with the read data. Both I/O reads and I/O writes may be non-posted transactions, as are configuration reads and writes. For AXI, any transaction between a host and an endpoint may be a non-posted transaction. A completion transaction may be initiated by the completer (destination) device, for example, when the read data is available to be send to the requester device. A completion TLP confirms that the completer device receives the request. For read requests, the completion TLPs may include the read data.

Figure 3:
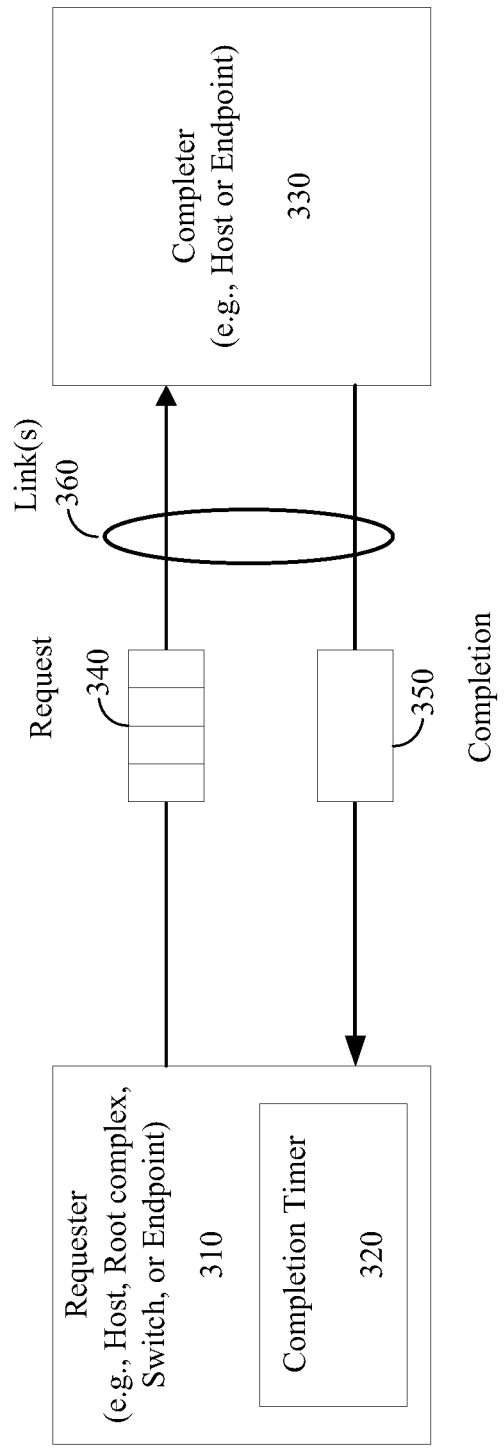
FIG. 3 illustrates example transactions between a requester device and a completer device.

FIG. 3 illustrates example transactions between a requester device 310 (e.g., a host such as a PCIe root complex, or an endpoint) and a completer device 330 (e.g., a PCIe endpoint or a host). For example, the transactions may be between a host and an endpoint, between two endpoints, between a switch and an endpoint, or between two hosts. Requester device 310 may send a posted or non-posted request 340 to completer device 330 through link(s) 360, which may include multiple lanes. If request 340 is a non-posted request, such as a memory read request, requester device 310 may start a completion timer 320 after a TLP for non-posted request 340 is transmitted to link(s) 360, and wait for a response from completer device 330. In one example, the timeout value for completion timer 320 may be set to, for example, 50 milliseconds. Completer device 330 may respond to the non-posted request by, for example, returning read data to requester device 310 using a completion TLP 350. For a non-posted write request, completer device 330 may return a completion TLP 350 without data, indicating that it has received the write request or that the write transaction has been performed successfully. If requester device 310 receives completion TLP 350 before completion timer 320 expires, requester device 310 may stop completion timer 320 or restart completion timer 320 for a different transaction.

In some implementations, for a non-posted transaction, if an error has occurred on completer device 330, completer device 330 may send completion TLP 350 that indicates an error status of the transaction, before completion timer 320 expires. For posted transactions, such as a memory write, if completer device 330 encounters an error, requester device 310 may not know it. In some implementations, if the posted transaction did not complete successfully, completer device 330 may send an error message that includes an error status (e.g., correctable, non-fatal, or fatal) to requester device 310.

For a non-posted transaction, if requester device 310 is unable to receive completion TLP 350 (e.g., with read data) successfully within the time period determined by the completion timer timeout value (e.g., 50 mS), completion timer 320 may expire, and a completion timeout error may be generated. This may occur if, for example, the completer device is not present, the address implemented in the customer logic is incorrect, the completer device drops the request, the completer device is under DDoS attacks, etc. The completion timeout error may be logged in a register on the requester device. An interrupt may be triggered to handle the completion timeout error. Thus, the performance of the requester device may be negatively impacted.

In some cases, the completer device may receive multiple transaction requests, which may be put in a queue and may be serviced according to certain order, such as the order the transaction requests are received. In some cases, the completer device may include a transaction buffer, for example, to store the transaction requests and/or data associated with the transaction requests.

In order to avoid or minimize the completion timeout errors and their impact on the performance of the requester device (e.g., a host), the completer device (e.g., an endpoint)

may be configured to send a response to the requester device before the completion timer on the requester device expires. For a given request (e.g., memory read) from the requester device, the completer device may start a preventive timer and wait for an amount of time set in for the preventive timer, which is shorter than the timeout value set for the completion timer on the requester device. After the preventive timer expires, the completer device may terminate the transaction and/or send a response to the requester device to complete the transaction. The response may indicate the error status of the transaction. The requester device may then stop the completion timer and take appropriate actions before an completion timeout error would occur. For example, the requester device may make sure that a correct address is included in the request, wait for a certain period of time before sending the request again, or send the request to a different completer device. This technique may work if the preventive timer timeouts occur rarely or randomly.

In some cases, such as during a DDoS attack, there may be a large number of requests to the completer device that may cause completion timeout errors and the interconnect may be heavily overloaded. In such cases, using a preventive timer having a fixed timer timeout value may still cause a completion timeout error for a particular request, because the accumulated time of the preventive timer for the requests before the particular request in a queue may still be longer than the timeout value of the completion timer. In certain aspects of this disclosure, an adaptive preventive timer having a dynamically reconfigurable timeout value may be used to prevent the completion timeout errors. The timeout value of the adaptive preventive timer may be dynamically reconfigured based on, for example, the number of timeouts occurred within a given time period.

For example, in some embodiments, peripheral device 210 of FIG. 2 may include an adaptive timeout prevention block (e.g., as a part of shell logic 230 or data path module 216) for monitoring the transactions between peripheral device 210 and computer device 220 or other computer devices to determine whether a transaction should be terminated before a completion timeout error may occur on a computer device. The adaptive timeout prevention block may have a reconfigurable preventive timer that can count up to a reconfigurable timeout value or count down from a reconfigurable timeout value. The reconfigurable preventive timer may be triggered, for example, when a request for a transaction is received from computer device 220, or when the preventive timer is reset (e.g., after a timeout or completion event) while other requests for transactions are waiting to be serviced. The reconfigurable timeout value may be shorter than a completion timeout value on computer device 220, such that the reconfigurable preventive timer in the adaptive timeout prevention block may expire before a completion timeout error could occur on computer device 220. The adaptive timeout prevention block may also monitor the number of timeouts occurred on the reconfigurable preventive timer within a certain time period. If the number of timeouts occurred on the reconfigurable preventive timer within the time period is greater than a threshold value, for example, when peripheral device 210 receives a large number of requests from one or more computer devices and/or when client configurable logic 240 is not responsive, the adaptive timeout prevention block may change the reconfigurable timeout value of the reconfigurable preventive timer to a lower value, such that a computer device for a requested transaction in a queue may receive a timeout message or completion message before a completion timeout error could occur on the computer device. More details of the adaptive timeout prevention block are described below.

Figure 4:
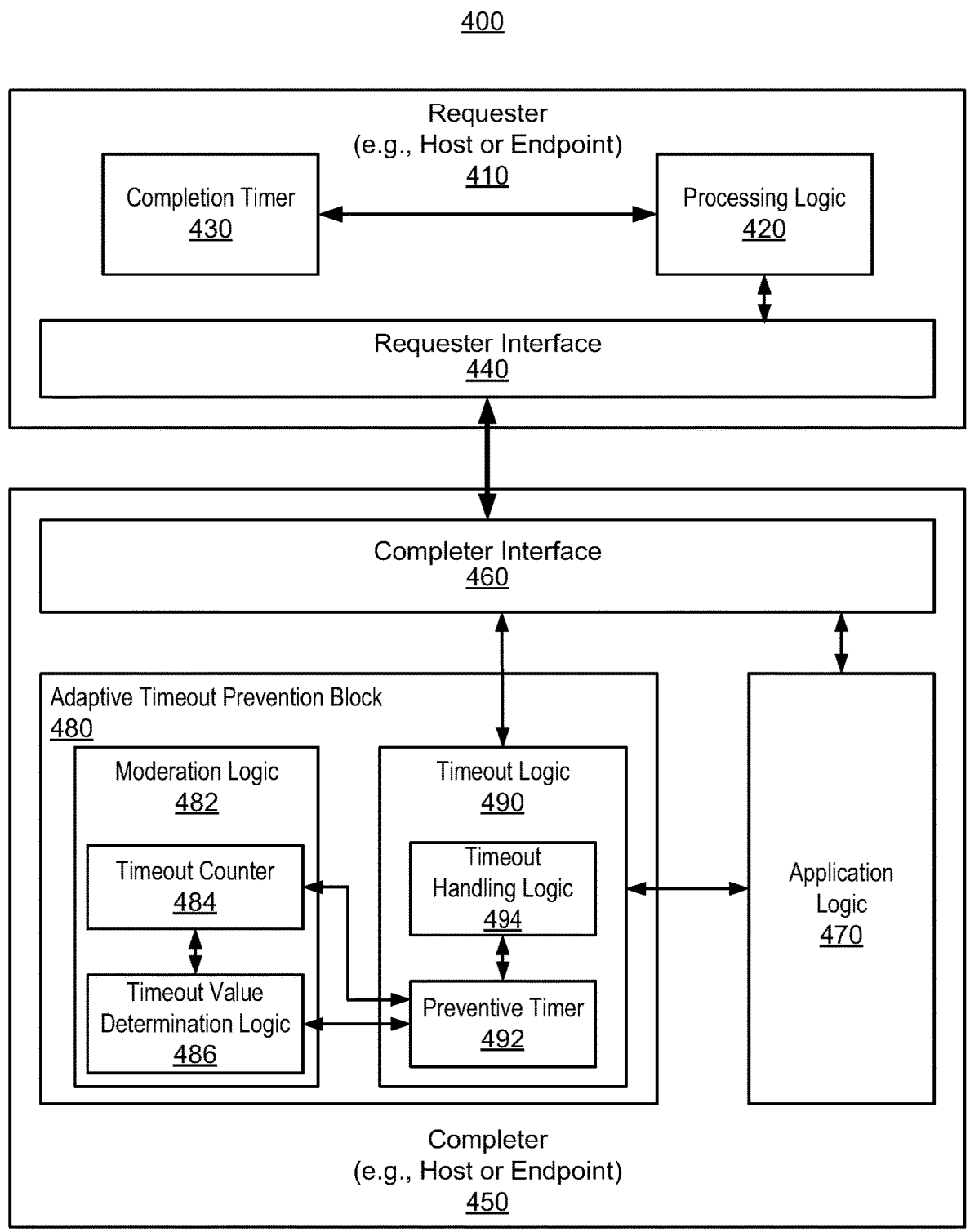
FIG. 4 is a simplified block diagram illustrating an example adaptive timeout prevention block on a completer device according to certain embodiments.

FIG. 4 is a simplified block diagram 400 illustrating an example adaptive timeout prevention block 480 on a completer device 450 (e.g., a host or an endpoint), according to certain embodiments. FIG. 4 shows a requester device 410 (e.g., a host or an endpoint) in communication with completer device 450 through a requester interface 440 on requester device 410 and a completer interface 460 on completer device 450 (e.g., PCIe, AXI, or other interfaces) using one or more digital interconnect links, such as PCIe, AXI, Ethernet, InfiniBand, or other network links. For example, in one specific example, requester device 410 may be a PCIe host, completer device 450 may be a PCIe endpoint, and the digital interconnect links between requester device 410 and completer device 450 may be PCIe links. Requester device 410 may include a processing logic 420, which may be similar to CPU 222 of FIG. 2. Requester device 410 may include a memory device (not shown in FIG. 4), which may be similar to memory 224 of FIG. 2. In addition, requester device 410 may include a completion timer 430, which may be implemented in hardware, software, firmware, or any combination thereof.

As described above, requester device 410 may send a transaction request, such as a memory read request, to completer device 450 using a transaction request TLP. After the transaction request TLP is sent, requester device 410 may start completion timer 430, which may have a timeout value set to, for example, 50 mS. Completion timer 430 may continue to count down or up until a response to the request is received from completer device 450 or until completion timer 430 expires. If the response from completer device 450 has not been received by requester device 410 before completion timer 430 expires, a completion timeout error may be generated and/or logged. An interrupt may be triggered and a device-specific software may be used to handle the interrupt caused by the completion timeout error.

Completer device 450 may be a peripheral device (e.g., an endpoint) that include an application logic 470, such as a client configurable logic circuit (e.g., FPGA) or an application-specific integrated circuit (ASIC) as described above with respect to FIGS. 1-2. In some implementations, application logic 470 may be reconfigurable by a customer for customer-specific applications. Completer device 450 may also include a shell logic (not shown), such as shell logic 230 described above with respect to FIG. 2. In addition, completer device 450 may also include an adaptive timeout prevention block 480, which may be a stand-alone circuit on completer device 450 or may be implemented as a part of the shell logic. Adaptive timeout prevention block 480 may be implemented as any combination of hardware, software, firmware. For example, adaptive timeout prevention block 480 may include one of an ASIC, a field-programmable gate array (FPGA), a system-on-chip (SoC), a system-in-package (SiP), a network processing unit (NPU), or a portion of an ASIC, FPGA, SoC, NPU, or SiP.

In some implementations, adaptive timeout prevention block 480 may include a timeout logic 490 and a moderation logic 482. Timeout logic 490 may be used to prevent a malfunctioning application logic or an application logic under a malicious attack (e.g., DDoS attack) from affecting the performance of requester device 410 or the whole cloud infrastructure system. Timeout logic 490 may monitor the status of the requests for transactions with application logic 470. In one example, timeout logic 490 may include a preventive timer 492 and a timeout handling logic 494.

Preventive timer 492 may include a timer circuit or a timer implemented in software. The timeout value of the timer may be set to different values at different times by moderation logic 482 and may be less than the timeout value of completion timer 430 on requester device 410.

For each request received on completer device 450 to perform a transaction using application logic 470, preventive timer 492 may count down from the set timeout value and expire when it reaches zero, or may count up from zero and expire when it reaches the set timeout value. If timeout logic 490 determines that application logic 470 completes a transaction request before preventive timer 492 expires, it may restart preventive timer 492 for a next transaction request. If application logic 470 does not complete the transaction request before preventive timers 492 expires, a timeout event may be generated. After the timeout event occurs, timeout handling logic 494 of timeout logic 490 may terminate or otherwise complete the transaction for the particular request. For example, timeout handling logic 494 may complete the transaction by removing the transaction from the queue of requests to be serviced by application logic 470, so that application logic 470 may be used to service other requests in the queue. In some implementations, timeout handling logic 494 of timeout logic 490 may also send a predefined data pattern in a completion TLP to requester device 410, send a completion TLP that includes an error status to requester device 410, or otherwise send a response that includes an error indication to requester device 410, as a part of completing the transaction (e.g., a non-posted transaction). Requester device 410 may take appropriate actions in response to the completion TLP or response from completer device 450 before completion timer 430 expires.

Preventive timer 492 or timeout handling logic 494 may also send the timeout information to moderation logic 482, which may include a timeout counter 484 and a timeout value determination logic 486. Timeout counter 484 may count the number of timeout events generated by timeout logic 490 during a predetermined period of time, such as, for example, 10 mS, 25 mS, 50 mS, 100 mS, 200 mS, or longer. As described above, in cases where completer device 450 may receive a large number of requests for transactions with application logic 470 that may cause completion timeout errors for some non-posted transactions, multiple timeouts may be generated by timeout logic 490 within a certain time window. For example, if application logic 470 is not responsive to transaction requests or does not have bandwidth to respond to the transaction requests, a number of timeout events maybe generated by timeout logic 490. As such, a particular transaction request may not be serviced by application logic 470 after a long period of time. As an illustrative example, if there are 10 transaction requests in the queue before the particular transaction request, and the timeout value for preventive timer 492 is set to, for example, 5 mS, application logic 470 may not start to service the particular request until up to 50 mS has passed since the particular transaction request is received on completer device 450. There might be, for example, up to 5 timeout events generated by timeout logic 490 and counted by timeout counter 484 during a monitoring time period of 25 mS.

Based on the number of timeout events generated by timeout logic 490 and counted by timeout counter 484 in a monitoring time window, timeout value determination logic 486 may determine a new timeout value to be used by preventive timer 492 during a moderation time period. In one example, the timeout value for the completion timer on requester device 410 may be set to 50 mS, the default (initial) timeout value for preventive timer 492 may be set to 5 mS, and the monitoring time period may be set to 25 mS. If timeout counter 484 detects that 3 or more timeout events have occurred with the 25 mS monitoring time period, timeout value determination logic 486 may determine that a new timeout value needs to be set for preventive timer 492, and may determine the new timeout value that is less than the default timeout value. For example, timeout value determination logic 486 may set the new timeout value for preventive timer 492 to 1 mS for the next 50 mS (moderation time period). After the moderation time period, timeout value determination logic 486 may set the timeout value for preventive timer 492 back to 5 mS, and timeout counter 484 may count the number of timeouts in a new monitoring time period to determine whether a new reduced timeout value is needed as described above.

In some implementations, timeout value determination logic 486 may determine the new timeout value for preventive timer 492 such that the total time for application logic 470 to service the particular transaction request and pending transaction requests before the particular transaction request in the queue is less than the completion timeout value of the completion timer on the requester device that sent the particular transaction request. For example, the new timeout value for preventive timer 492 (second preventive timer timeout value) may be set based on:

$$T_c > T_{p1} \times N_{p1} + T_{p2} \times N_{p2},$$

where Tc is the completion timer timeout value, $T_{p1}$ is the first (initial or default) preventive timer timeout value, $N_{p1}$ is the number of transactions to be handled using the first preventive timer timeout value, $T_{p2}$ is the second preventive timer timeout value, and $T_{p2}$ is the number of transactions to be processed using the second preventive timer timeout value before the particular transactions request. In some implementations, $T_{p1} \times N_{p1}$ may be replaced by the monitoring time period. In some implementations, $N_{p2}$ may be the number of pending transaction requests in a queue at the time the second preventive timer timeout value is determined.

In one specific example, the timeout value for the completion timer on requester device 410 may be set to 50 mS, the first preventive timer timeout value for preventive timer 492 may be set to 5 mS, and the monitoring time period may be set to 25 mS. If there are 20 pending transaction requests waiting to be serviced by application logic 470, the second preventive timer timeout value may be set to, for example, 1 mS, such that 25 mS+1 mS×20<50 mS. In this way, completer device 450 may respond to a particular transactions request from requester device 410 before a completion timeout error may occur on requester device 410.

In various implementations, timeout value determination logic 486 may determine the new timeout value for preventive timer 492 based on the number of timeout events generated by timeout logic 490 and counted by timeout counter 484 in the monitoring time period, the current timeout value for preventive timer 492, and/or other parameters such as the transaction buffer size on the requester device or the completer device.

In one example, timeout value determination logic 486 may determine the new timeout value for preventive timer 492 based on the number of timeout events generated by timeout logic 490 in a monitoring time period. If the number of timeout events is less than a threshold value, a first timeout value may be set for preventive timer 492; otherwise, a second timeout value may be set for preventive timer 492.

In some other examples, timeout value determination logic 486 may determine the new timeout value for preventive timer 492 using a table or a linear or nonlinear equation, based on the number of timeout events generated by timeout logic 490 in the monitoring time period. For example, a table may include a plurality of ranges and corresponding timeout values. The new timeout value may be determined based on the range that the number of timeout events generated by timeout logic 490 falls in. In another example, the new timeout value may be determined using a linear function of the number of timeout events generated by timeout logic 490, rather than a step function. In yet another example, the new timeout value may be determined using a linear or nonlinear function of the number of timeout events generated by timeout logic 490 and other parameters, such as the transaction buffer size on the requester device or the completer device, and/or the number of pending transactions.

In some examples, timeout value determination logic 486 may determine the new timeout value for preventive timer 492 using a table or a linear or nonlinear equation, based on the number of timeout events generated by timeout logic 490 in the monitoring time period and the current state of preventive timer 492 (e.g., current timeout value of preventive timer 492). For example, the table may include a plurality of ranges of the number of timeout events generated by timeout logic 490 in one dimension, and a plurality of states of preventive timer 492 in another dimension. A new timeout value for preventive timer 492 may be selected based on the range that the number of timeout events generated by timeout logic 490 falls in and the current state of preventive timer 492.

As in FIG. 3, requester device 410 and completer device 450 may be any of a host (e.g. a PCIe root complex), a switch, an endpoint, or other networked device. Thus, adaptive timeout prevention block 480 may be implemented on a host, a switch, an endpoint, or other device, to handle transactions, for example, between a host and an endpoint, between two endpoints, between two host, or between a switch and an endpoint.

It is note that, as used herein, a logic or a block may refer to any combination of hardware, software, firmware, middleware, microcode, and hardware description languages to perform one or more logic functions. Thus, any of application logic 470, adaptive timeout prevention block 480, timeout logic 490, timeout handling logic 494, preventive timer 492, moderation logic 482, timeout counter 484, and timeout value determination logic 486 may be implemented as any combination of hardware, software, firmware, middleware, microcode, and hardware description languages.

Figure 5:
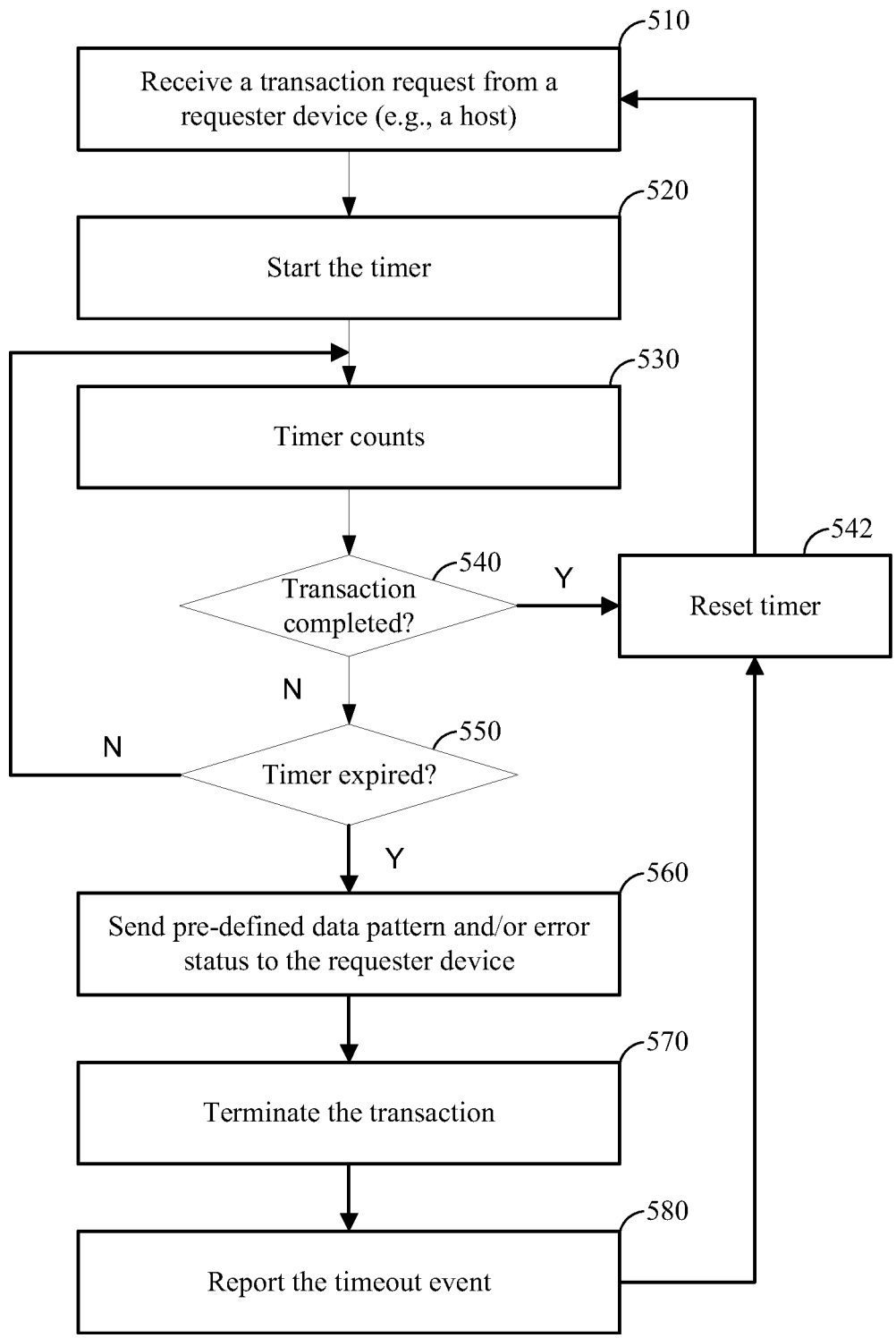
FIG. 5 is a simplified flow chart illustrating an example method of preventing completion timeout errors by a timeout logic according to certain embodiments.

FIG. 5 is a simplified flow chart 500 illustrating an example method of preventing completion timeout errors by a timeout logic of an adaptive timeout prevention block (e.g., for a client configurable logic circuit) according to certain embodiments. Operations in flow chart 500 may be performed by a timeout logic on a completer device, such as timeout logic 490 on completer device 450 described above with respect to FIG. 4. Operations in flow chart 500 may be implemented in hardware, software, firmware, or any combination thereof.

At 510, the timeout logic may receive a transaction request (e.g., a memory read request) from a requester device, such as requester device 410. At 520, in response to the transaction request, the timeout logic may start a timer, such as preventive timer 492. The timeout value for the timer may be an initial or default timeout value or may be a reduced timeout value that is less than the initial timeout value.

At 530, the timer may count up or down before the timer expires. At block 540, the timeout logic may determine whether the requested transaction has been completed. If the requested transaction has been completed, for example, a completion TLP has been sent by the completer device to the requester device, the timeout logic may reset the preventive timer at 542 and wait for a new transaction request at 510. If the requested transaction has not been completed, for example, a completion TLP has not been sent by the completer device to the requester device, the timeout logic may determine whether the preventive timer has expired or timed out at 550. If the preventive timer has not expired, the preventive timer may continue to count at 530 and the timeout logic may continue to monitor the status of the requested transaction at 540. If the preventive timer has expired at a certain time instant before the requested transaction has been completed, the timeout logic may proceed to 560.

At 560, the timeout logic (or more specifically, a timeout handling logic, such as timeout handling logic 494) may send, for example, a pre-defined data pattern in a completion TLP or an error status in an error message, to the requester device. The timeout logic may then complete (e.g., terminate) the current transaction at 570 as described above with respect to FIG. 4, report the timeout event to a moderation logic (e.g., moderation logic 482) at 580, reset the preventive timer at 542, and wait for or start to process a new transaction request at 510.

Figure 6:
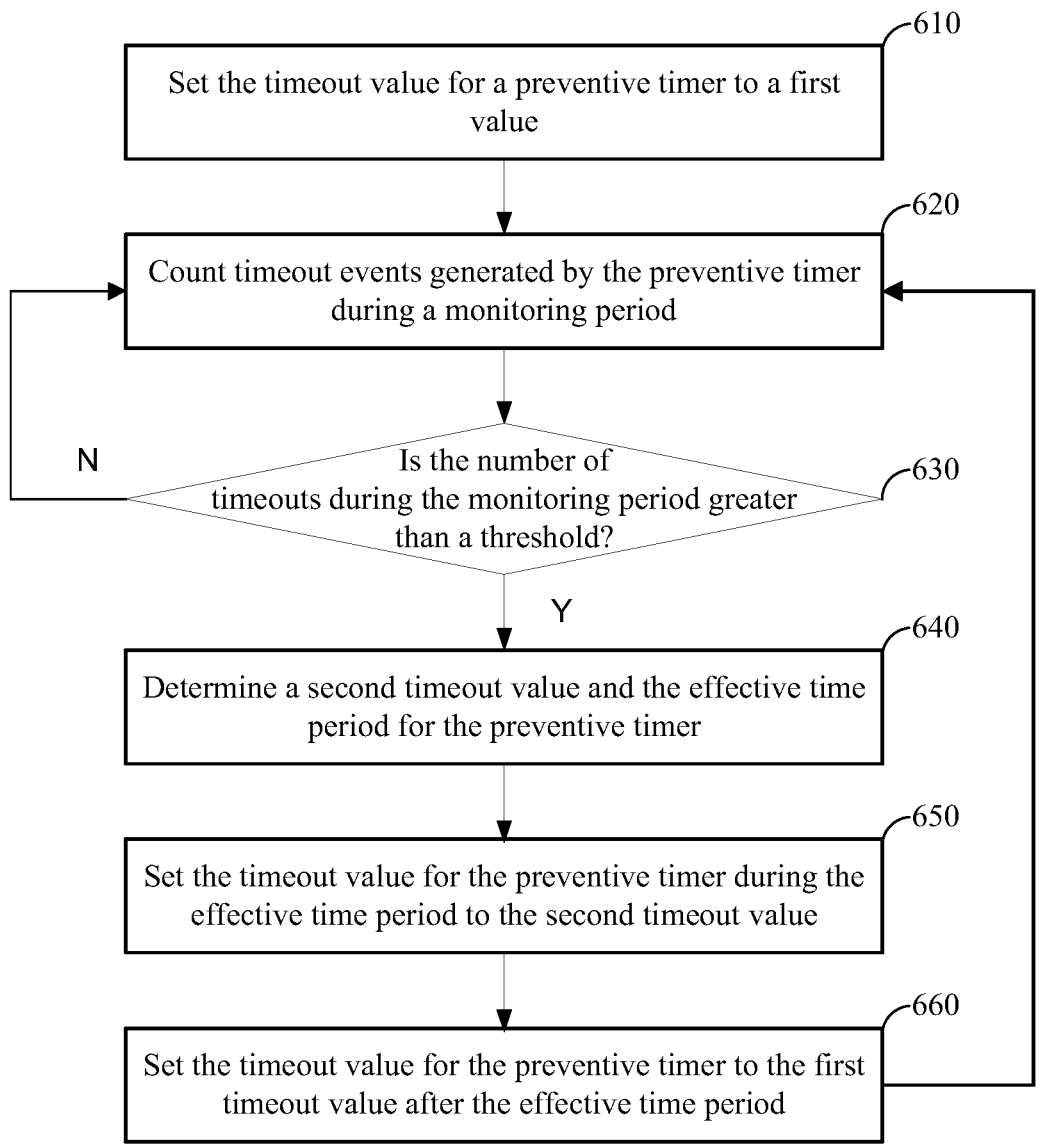
FIG. 6 is a simplified flow chart illustrating an example method of preventing completion timeout errors by a moderation logic according to certain embodiments.

FIG. 6 is a simplified flow chart 600 illustrating an example method of preventing completion timeout errors by a moderation logic of an adaptive timeout prevention block (e.g., for a client configurable logic circuit) according to certain embodiments. Operations in flow chart 600 may be performed by a moderation logic on a completer device, such as moderation logic 482 on completer device 450 described above with respect to FIG. 4. Operations in flow chart 600 may be implemented in hardware, software, firmware, or any combination thereof. It is noted that FIG. 6 illustrates one example method of adaptively determining a new timeout value for a preventive timer. Other methods of determining the new timeout value for the preventive timer as described above with respect to FIG. 4 may be used in different implementations.

At 610, the moderation logic may set the timeout value for a preventive timer (e.g., preventive timer 492) to a first value (e.g., 5 mS or 10 mS), which may be a default value. The preventive timer may be used to determine whether a transaction has been completed within a time period determined by the timeout value, as described above with respect to, for example, FIG. 5.

At 620, the moderation logic may determine the number of timeout events that occurred during a pre-determined monitoring time period, such as, for example, 25 mS, based on timeout events reported by, for example, the timeout logic at 580.

At 630, the moderation logic may determine if the number of timeouts that occurred during the monitoring period is greater than a threshold value. For example, the moderation logic may determine if there are more than 2 timeout events generated by the timeout logic during the last 25 mS. If the number of timeout events occurred during the last monitoring time period is not greater than the threshold value, the moderation logic may continue to count at 620 the number of timeout events generated by the timeout logic in a moving time window, such as, for example, 25 mS. If the number of timeouts during the last counting period is greater than a threshold value, the moderation logic may proceed to 640 in flow chart 600.

At 640, the moderation logic may determine a second timeout value for the preventive timer and the effective time period during which the second timeout value may be used, as described above with respect to FIG. 4. The second timeout value may be less than the first timeout value.

At 650, the moderation logic may set the timeout value for the preventive timer of the timeout logic to the second timeout value during the effective time period, and the preventive timer may perform the operations as described in FIG. 5 using the second timeout value for the preventive timer.

At 660, after the effective time period, the moderation logic may set the timeout value for the preventive timer back to the first timeout value, and start or continue to count the number of timeout events during a monitoring time period at 620.

Even though FIGS. 5 and 6 describe example methods as sequential operations, some of the operations may be performed in parallel or concurrently. An operation may have additional steps not included in the figure. Some operations may be performed in different order. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 7:
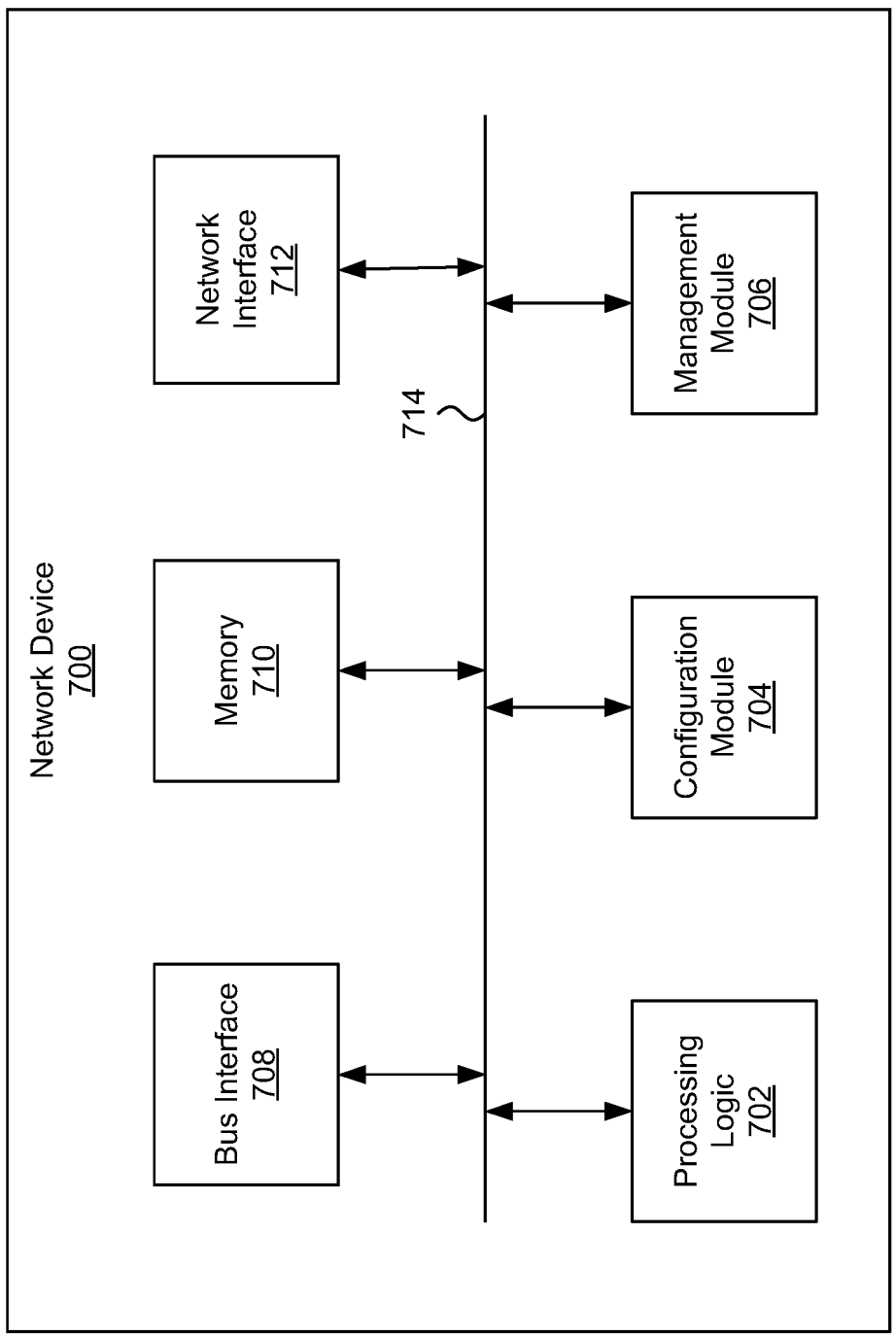
FIG. 7 illustrates an example environment of a network device for implementing aspects in accordance with some embodiments.

FIG. 7 illustrates an example of a network device 700. Network device 700 may be used to implement, for example, computer devices 100*a*-100*c*, host access device 122, peripheral device 210, computer device 220, or other devices (e.g., switches and routers) in cloud computing environments. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include ASICs, field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
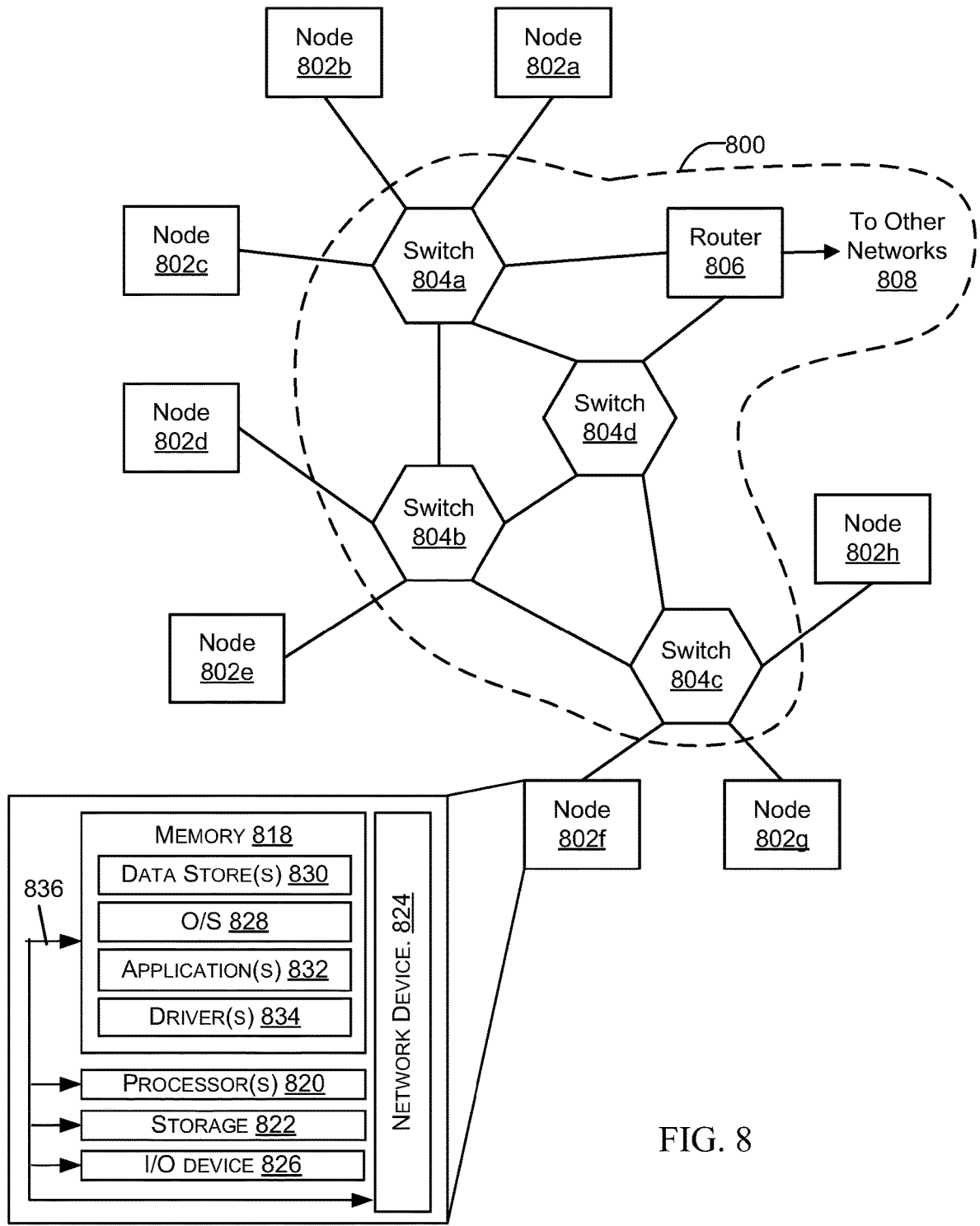
FIG. 8 illustrates an example architecture for features and systems described herein that includes one or more service provider computers and/or a user device connected via one or more networks, according to some embodiments.

FIG. 8 illustrates a network 800, illustrating various different types of network devices 700 of FIG. 7, such as nodes comprising the network device, switches and routers. In certain embodiments, network 800 and the nodes may form a part of a cloud computing environment. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more applications 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application(s) 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application(s) 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
   a processing logic circuit; and
   a timeout logic configured to:
      generate a timeout event based on a transaction not completed by the processing logic circuit within a timeout period;
      determine a number of the timeout events generated during a monitoring period; and
      responsive to determining that the number equals to or exceeds a threshold, reduce the timeout period.

2. The apparatus of claim 1, wherein the timeout logic is configured to, responsive to determining that the transaction is not completed by the processing logic circuit within the timeout period, cause the processing logic circuit to terminate or complete the transaction when the timeout period expires.

3. The apparatus of claim 1, wherein the transaction is requested by a requester device; and
   wherein the timeout logic is configured to transmit a response including at least one of an error indication or a pre-defined data pattern to the requester device.

4. The apparatus of claim 3, wherein the response causes the requester device to perform at least one of: terminate a first request for the transaction, transmit a second request to the apparatus to complete the transaction, or transmit a third request to the apparatus to terminate the transaction.

5. The apparatus of claim 3, wherein a response for the transaction is expected by the requester device.

6. The apparatus of claim 3, wherein the timeout period is a first timeout period; and
   wherein the timeout logic is configured to transmit the response before a second timeout period at the requester device expires to prevent the requester device from triggering an interrupt.

7. The apparatus of claim 6, wherein the timeout logic is configured to reduce the first timeout period from a first value to a second value for a moderation period, and to restore the first timeout period back to the second value after the moderation period expires.

8. The apparatus of claim 7, wherein the timeout logic is configured to determine the second value based on the first value and a first number of transactions handled by the processing logic circuit with the first timeout period set to the first value.

9. The apparatus of claim 7, wherein the timeout logic is configured to determine the second value based on a number of pending transactions stored in a queue to be handled by the processing logic circuit with the first timeout period set to the second value.

10. The apparatus of claim 9, wherein the pending transactions are stored in the queue prior to the apparatus receiving a subsequent request for another transaction; and
    wherein the processing logic circuit is to complete the another transaction with the first timeout period set to the second value.

11. The apparatus of claim 9, wherein the pending transactions are stored in the queue when the second value is determined.

12. The apparatus of claim 7, wherein the timeout logic is configured to determine the second value of the first timeout period based on a duration of the second timeout period.

13. The apparatus of claim 7, wherein the timeout logic is configured to determine the second value based on a duration of the monitoring period.

14. The apparatus of claim 7, wherein the timeout logic is configured to determine the second value based on a relationship that maps different candidate second values to different first values of the first timeout period for the number of the timeout events.

15. The apparatus of claim 14, wherein the relationship is represented based on a table or an equation implemented by the timeout logic.

16. The apparatus of claim 3, further comprising:
    an interface configured to receive transaction requests from the requester device and send responses to the requester device, wherein the interface is coupled to the timeout logic.

17. The apparatus of claim 16, wherein the interface comprises a Peripheral Component Interconnect Express (PCIe) interface or an Advanced eXtensible Interface (AXI) interface.

18. The apparatus of claim 1, wherein the timeout logic comprises an application-specific integrated circuit (ASIC), a field-programmable gate array (FPGA), a system-on-chip (SoC), a system-in-package (SiP), a network processing unit (NPU), or a portion of an ASIC, FPGA, SoC, NPU, or SiP.

19. The apparatus of claim 1, wherein the timeout logic is implemented based on executing software instructions on a controller.

20. The apparatus of claim 1, wherein the timeout logic is configured to reduce the timeout period to a value based on a number of transactions to be handled by the processing logic circuit.

21. A method comprising:
    generating a timeout event based on a transaction not completed by a processing logic circuit within a timeout period;
    determining a number of the timeout events generated during a monitoring period; and
    responsive to determining that the number equals to or exceeds a threshold, reducing the timeout period.

22. The apparatus of claim 20, wherein the timeout logic is configured to determine the value based on a total completion time within which the number of transactions are to be completed by the processing logic circuit.

* * * * *